Dec. 29, 1959 R. SCHÖN 2,919,081
STABILIZING SYSTEM FOR HELICOPTER AIRCRAFT
Filed Feb. 25, 1957 2 Sheets-Sheet 1

INVENTOR.
Richard Schön
BY

Dec. 29, 1959                R. SCHÖN                2,919,081
            STABILIZING SYSTEM FOR HELICOPTER AIRCRAFT
Filed Feb. 25, 1957                           2 Sheets-Sheet 2
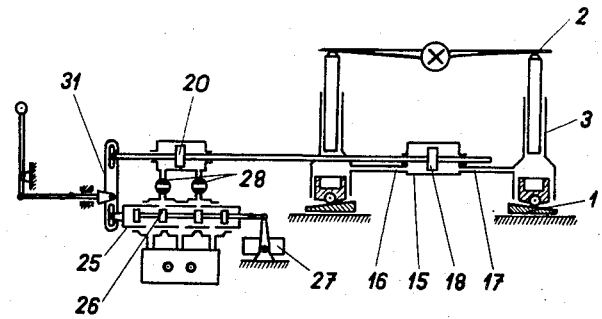
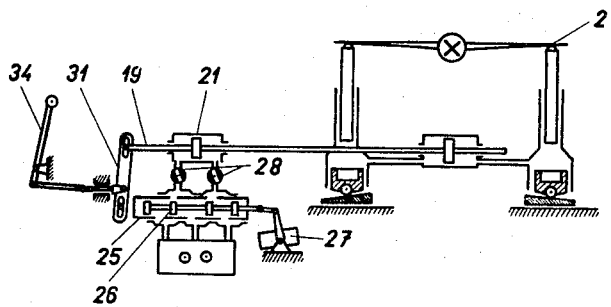
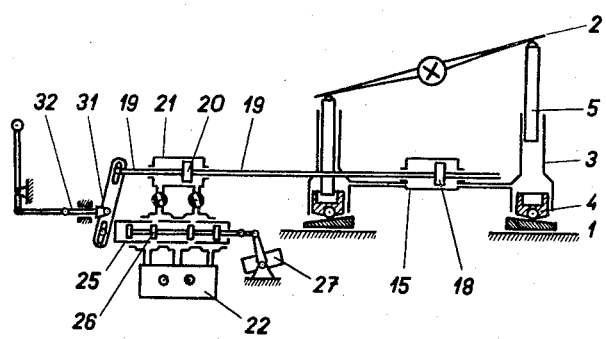
INVENTOR.
Richard Schön
BY United States Patent Office 2,919,081
Patented Dec. 29, 1959

2,919,081

STABILIZING SYSTEM FOR HELICOPTER AIRCRAFT

Richard Schön, Prague, Czechoslovakia, assignor to Výzkumný a zkušební letecký ústav, Letnany, near Prague, Czechoslovakia Application February 25, 1957, Serial No. 642,194

5 Claims. (Cl. 244—17.13)

The present invention relates to a stabilizing system for helicopter aircraft provided with rotors having a plurality of blades, which stabilizing system may act as an automatic pilot for maintaining a straight forward flight.

At the present time stabilizing systems are practically used only for helicopters with two-bladed rotors. The use of similar systems, that is, systems employing a gyroscope or a servomotor arranged outside the fuselage, is rather inconvenient from the point of view of construction and in some cases even impossible in the case of multi-bladed rotors. Large helicopter aircraft are therefore frequently provided with so called robot pilots, which are particularly designed for this purpose. However, such arrangements are expensive and heavy and their installation is inadvisable in helicopters of medium size.

It is an object of the present invention to provide a stablizing system for helicopters having multi-bladed rotors which is simple in construction and of reduced weight.

The above, and other objects, features and advantages of the invention, will be apparent in the following detailed description of an illustrative embodiment of the invention which is to be read in connection with the accompanying drawings forming a part hereof, and wherein:

Figs. 3, 4 and 5 are schematic views showing various conditions of the system of Figs. 1 and 2.

The stabilizing system embodying this invention is included in the cyclic pitch-control of helicopter and autogiro aircraft which are provided with a swash plate.

Figure 1:
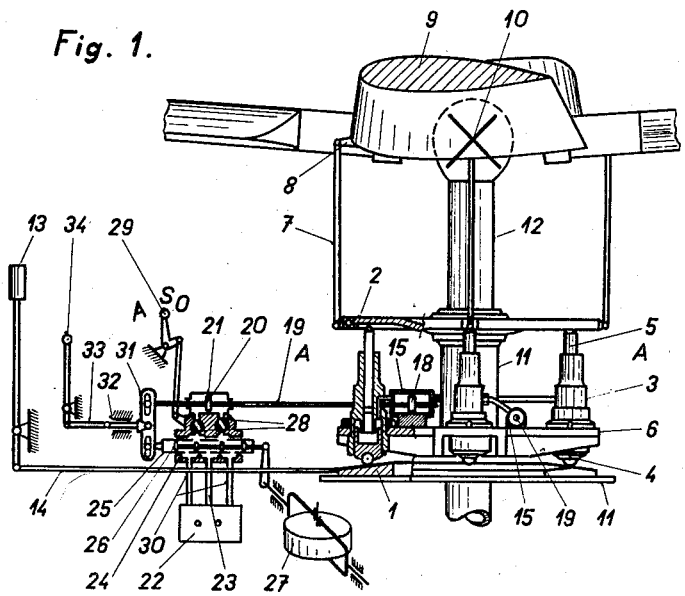
Fig. 1 is a schematic elevational view, partly broken away and in section, of a stabilizing system embodying this invention.
Figure 2:
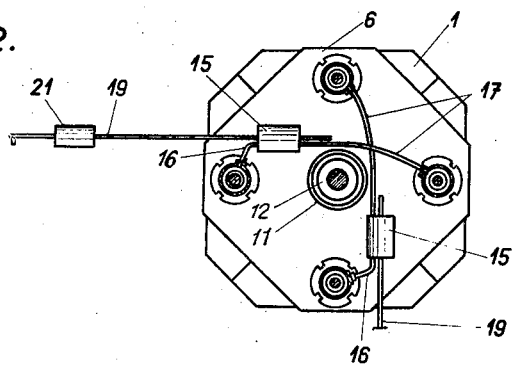
Fig. 2 is a horizontal sectional view taken along the line A—A of Fig. 1.

Referring to Figs. 1 and 2, it will be seen that hydraulic braces or supports 3 are provided between the swash plate 2 and a truncated pyramid 1 which is guided in the main directions of the cyclic pitch-control. The faces of the pyramid are at a small angle with respect to its base. Each of the hydraulic braces or supports 3 includes a cylinder having a larger lower piston 4 and a smaller upper piston 5 slidable therein and the cylinder is supported by a bracket 6. The supports 3 are arranged symmetrically about the swash plate axis with the axes of the supports lying in planes that are angularly displaced by 90° so that two of the supports 3 lie in a plane containing the main flight direction of the aircraft, and the remaining supports lie in a plane perpendicularly to said direction. The swash plate 2 is linked by tie rods 7 with the levers 8 of the rotor blades 9 which are mounted on the rotor head 10. The cyclic pitch control system has a holder 11 through which the rotor shaft 12 passes. The truncated pyramid 1 is actuated by the pilot's control lever 13 by means of a tie rod 14 (the lateral movement of the truncated pyramid is not shown for the sake of clearness).

The stabilizing system may be provided either for stability only in the longitudinal direction or also in the lateral direction. Both systems are substantially the same and each comprises a working cylinder 15 having its opposite ends connected by means of conduits 16 and 17 with the interior of the cylinders of two opposite hydraulic supports 3 between the pistons 4 and 5 of the related cylinder so that fluid under pressure admitted to the cylinder urges the piston 5 upwardly against swash plate 2 and the piston 4 in the downward direction against pyramid 1. Inside the cylinder 15 there is a slidable piston 18, coupled by a piston rod 19 with a piston 20 in an hydraulic cylinder 21. The hydraulic or other fluid under pressure from the pump 22 flows through the conduit 23 to a hydraulic regulator composed of a distributing body 24 with a distributing cylinder 25 slidable therein, and a cylindrical slide valve 26 slidable in cylinder 25 and, within said cylinder, linked to a gyroscope 27. Two throttle valves 28 are suitably controlled by a hand lever 29 to regulate the flow from body 24 to the cylinder 21 at opposite sides of piston 20. Return conduits 30 extend from body 24 back to the tank or reservoir feeding the pump 22.

The distributing cylinder 25, which is slidable in the distributing body 24, is connected to one end of the lever 31, while the other end of the lever 31 is pivotally connected to the piston rod 19. The lever 31 is pivotally mounted, intermediate its ends, on a longitudinally guided rod 32 which is connected to a control lever 34 by way of a tie rod 33 so that actuation of the control lever 34 serves to displace the location of the pivoting axis of lever 31 with respect to the fixed cylinder 20 and the fixed distributing body 24. If desired, a clutch and an interlocking device (not shown) may be provided between the control levers 13 and 34 so that movement thereof may be simultaneously effected.

As is apparent in the drawings, control of the supplying of fluid under pressure to the cylinder 21 as the opposite sides of the piston 20 therein depends upon the position of the slide valve 26 relative to the distributing cylinder 25. Thus, if the slide valve 26 is initially displaced by the gyroscope 27, such displacement of the slide valve will serve to effect the supplying of the fluid under pressure to the cylinder 21 at one side or the other side of the piston 20. However, by reason of the connection of piston rod 19 to the lever 31, the displacement of the piston 20 resulting from the supplying of fluid under pressure to one side of the cylinder 21 will cause a corresponding angular displacement of the lever 31, whereby the distributing cylinder 25 will be axially displaced relative to the housing or body 24 so that the slide valve 26 is again in a neutral position relative to the distributing cylinder 25.

Further, it will be apparent that the cylinder 15 with a piston 18 slidable therein, the conduits 16 and 17, and the cylinders of the related hydraulic supports 3 all form a closed hydraulic system so that axial movement of the piston 18 by the piston rod 19 serves to drive hydraulic fluid out of one end of the cylinder 15, while hydraulic fluid is sucked into the other end of the cylinder 15.

The operation of the above described stabilizing system will now be described with reference to Figs. 3, 4 and 5 of the drawings.

In Fig. 3, the stabilizing system embodying this invention is illustrated in its neutral, inoperative condition. It will be apparent that the neutral position of gyroscope 27, that is, when the helicopter is on an even keel, corresponds to a neutral or central position of slide valve 26 relative to distributing cylinder 25, while the distributing cylinder 25 is centered within the body 24 by reason of the neutral position of lever 31 resulting from the central positions of pistons 20 and 18 within cylinders 21 and 15, respectively.

With the gyroscope 27 and the lever 31 in their neutral positions, as illustrated in Fig. 3, piston 18 is centrally located within cylinder 15 so that the pressures of fluid acting in the cylinders of supports 3 connected to cylinder 15 by conduits 16 and 17 are equal. If the hand controlled valves 28 are both closed, as in Fig. 3, the positions of the pistons 18 and 20 are fixed, and the control of the rotor by the swash plate 2 is independent of the hydraulic stabilizing system and cannot be influenced by any accidental failure in the hydraulic control or regulation.

Fig. 4 illustrates the use of the stabilizing system embodying the present invention as a hydraulic booster for the manual control of the aircraft. Thus, assuming that the valves 28 between body 24 and cylinder 21 are at least partly open, as in Fig. 4, any deviation of the gyroscope 27, for example, by reason of inclination of the helicopter resulting from a change of the flying speed, serves to displace slide valve 26 relative to distributing cylinder 25. If the deviation of gyroscope 27 causes displacement of slide valve 26 toward the left relative to distributing cylinder 25, as in Fig. 4, such relative displacement of the slide valve would tend to cause the fluid under pressure to be supplied from pump 22 to cylinder 21 at the left hand side of piston 20 therein, thereby to displace pistons 20 and 18 toward the right, as viewed in Fig. 4, in order to tilt swash plate 2 in the counter-clockwise direction. However, if the pilot, upon deviation of gyroscope 27, manually displaces control lever 34, as shown in Fig. 4, so that the lever 31 is rocked about its pivotal connection to piston rod 19 which is held against axial displacement by the fluid under pressure at the opposite sides of piston 20, then the lower portion of lever 31 moves toward the left to displace distributing cylinder 25 through a distance equal to the displacement of slide valve 26 by the gyroscope 27, whereby slide valve 26 and distributing cylinder 25 are returned to their relative neutral position. Thus, it is possible to actuate the swash plate 2 by manipulation of the control lever 34 so that the described hydraulic system acts as a booster, and this feature of the stabilizing system is of considerable usefulness in large and heavy helicopter aircraft where the control forces may be excessive.

Referring now to Fig. 5 of the drawings, wherein the operation of the described system in stabilizing the flight of a helicopter is illustrated, it will be seen that, if the gyroscope deviates with respect to the fixed frame of reference, that is, if the helicopter is inclined while the gyroscope maintains its normal attitude, slide valve 26 will be shifted relative to distributing cylinder 25, for example, toward the left, as viewed in Fig. 5, so that fluid under pressure is admitted to cylinder 21 at the left hand side of piston 20, while the space within cylinder 21 at the right hand side of piston 20 is connected to the return conduit 30 extending back to the tank or reservoir from which hydraulic fluid is led to the inlet of pump 22. Such actuation of slide valve 26 causes piston rod 19 and piston 18 to be displaced toward the right, as viewed in Fig. 5, so that the piston 5 of hydraulic support appearing at the right is lifted, while the piston 5 of the left hand hydraulic support 3 is lowered and a corresponding tilt is imparted to the swash plate 2. Assuming that the control lever 34 is held immobile, contrary to the situation in Fig. 4, it will be apparent that movement of piston rod 19 toward the right, as described above, will effect clockwise rocking of lever 31 about its pivotal connection to guided rod 32, so that distributing cylinder 25 connected to the lower end of lever 31 will be drawn toward the left, as viewed in Fig. 5 and thereby returned to its neutral position relative to slide valve 26. Thus, when swash plate 2 has been tilted to a degree corresponding to the inclination of the aircraft sensed by gyroscope 27, the return of distributing cylinder 25 to its neutral position relative to slide valve 26 will halt the further supplying of fluid under pressure to the left hand portion of cylinder 21. Thus, further movement of piston 20 toward the right is halted.

Since the relatively large pistons 4 projecting from the lower ends of the cylinders of hydraulic supports 3 always bear against a stable support formed by the truncated pyramid 1, displacement of the piston 18 within cylinder 15 always effects movements of the small pistons 5 relative to the cylinders of the hydraulic supports. Since the angle enclosed between the inclined surfaces of pyramid 1 and the base thereof is very small, as is apparent from the drawings, the downward thrusts of the pistons 4 upon pyramid 1 do not tend to effect horizontal displacements of the pyramid 1 so that the stabilizing forces applied to the pistons 5 are not transmitted to the control lever 13 by which the pyramid 1 is normally displaced. Accordingly, there is no necessity for locking the position of the control stick 13 during operation of the stabilizing system.

It is apparent that the rate of delivery of fluid under pressure from the pump 22 to the cylinder 21 by way of the described distributing valve may be regulated by the pilot merely by adjusting the throttling valves 28 by means of the lever 29. Such control of the rate of delivery of fluid under pressure to the cylinder 21 serves to regulate the delay of the response of the stabilizing system to deviations sensed by the gyroscope 27, and it is possible to obtain any desired condition between that of no stabilization, when valves 28 are fully closed, to fully automatic or autopilot flight, in which case the helicopter is maintained in level flight exclusively by operation of the described system. Between such extremes, it is possible to obtain varying degrees of stabilization which more or less completely correct or compensate for inclinations or tilting of the aircraft.

Although the invention has been described in connection with a particular cyclic control system for helicopters, it is apparent that the described stabilizing system may be used in other cyclic control systems employing hydraulic supports or motors, such as the supports 3, for effecting movements of the swash plate 2.

What I claim is:

1. In a rotary wing aircraft having a multibladed rotor, the combination of a cyclic pitch control for the rotor including a swash plate and paired hydraulic supports for controlling the tilt of said swash plate and each including a cylinder and a slidable piston projecting upwardly from the latter to act on said swash plate, a working cylinder containing hydraulic fluid and with a working piston slidable therein, conduit means connecting the opposite ends of said working cylinder to the cylinders of a pair of said hydraulic supports so that the pistons of the latter are displaced in opposite directions in response to movement of the piston in said working cylinder, an actuating cylinder having an actuating piston slidable therein, a piston rod connected to said actuating piston and to said working piston so that the latter is displaced by movement of said actuating piston, a source of fluid under pressure, regulating means for controlling the supplying of fluid under pressure from said source to said actuating cylinder at the opposite sides of said actuating piston, said regulating means including a valve housing, a distributing cylinder slidable in said housing and a slide valve member slidable in said distributing cylinder, said distributing cylinder having ports therein with which said valve member cooperates so that, in a neutral relative position of said distributing cylinder and valve member, said actuating cylinder, at both sides of the piston therein, is isolated from said source, while, upon relative displacement of said distributing cylinder and valve member to either side of said neutral position, fluid under pressure is fed through said regulating means to said actuating cylinder at a corresponding side of said actuating piston for moving the latter and said working piston, gyroscopic means operatively connected to said valve member for displacing the latter relative to said valve housing, and means connected to said piston rod and said distributing cylinder and operative in response to movement of said piston rod with said actuating and working pistons to return said distributing cylinder to said neutral position relative to said valve member.

2. In a rotary wing aircraft having a multibladed rotor, the combination as in claim 1; wherein said means connected to said piston rod and said distributing cylinder includes a two-armed lever connected, at its opposite ends, to said piston rod and distributing cylinder, respectively, a movable support having said two-armed lever pivoted thereon intermediate the ends of the latter, and manually actuable means connected to said movable support so that the pivoting axis of said two-armed lever can be displaced for moving said distributing cylinder relative to said valve member to effect the selective supplying of fluid under pressure to said actuating cylinder under manual control.

3. In a rotary wing aircraft having a multibladed rotor, the combination as in claim 2; wherein each of said hydraulic supports further includes a relatively large diameter piston projecting slidably out of the lower end of the related cylinder, a truncated pyramid having an upper surface with a small angle of inclination against which the large diameter pistons of the hydraulic supports bear so that displacement of said pyramid in a plane perpendicular to the axes of said hydraulic supports will cause opposite movements of the large diameter pistons of the paired hydraulic supports and correspondingly large movements of the related pistons projecting upwardly to act on said swash plate, while changes in the pressures of hydraulic fluid in said cylinders of the paired hydraulic supports resulting from displacement of said working piston are ineffective to displace said pyramid by reason of said small angle of inclination of the upper surface of the latter.

4. In a rotary wing aircraft having a multibladed rotor, the combination as in claim 3; further comprising manually actuable control means for effecting displacement of said pyramid in said plane perpendicular to the axes of the hydraulic supports, and means for selectively coupling said manually actuable control means to said manually actuable means connected to the movable support, so that said actuating and working cylinders then operate as a hydraulic booster for the manual control of the swash plate.

5. In a rotary wing aircraft having a multibladed rotor, the combination as in claim 1; further comprising manually controllable throttling valve means between said regulating means and said actuating cylinder adjustable to vary the rate of flow of fluid under pressure therebetween from zero flow to a maximum rate of flow, so that the sensitivity of the control of tilting of said swash plate to said gyroscopic means may be correspondingly adjusted.

References Cited in the file of this patent

UNITED STATES PATENTS

| | | |
|---|---|---|
| 2,443,192 | Moeller | June 15, 1948 |
| 2,479,549 | Ayres | Aug. 23, 1949 |
| 2,550,538 | Doman | Apr. 24, 1951 |
| 2,687,856 | Doman | Aug. 31, 1954 |